US006635974B1

(12) United States Patent
Karuppana et al.

(10) Patent No.: US 6,635,974 B1
(45) Date of Patent: Oct. 21, 2003

(54) SELF-LEARNING POWER MANAGEMENT SYSTEM AND METHOD

(75) Inventors: Samy V. Karuppana, Kent, WA (US); Aly Amirali Jetha, Seattle, WA (US); Jes Thomsen, Copenhagen (DK)

(73) Assignee: Midtronics, Inc., Willowbrook, IL (US)

( * ) Notice: Subject to any disclaimer, the term of this patent is extended or adjusted under 35 U.S.C. 154(b) by 300 days.

(21) Appl. No.: 09/653,682

(22) Filed: Sep. 1, 2000

Related U.S. Application Data
(60) Provisional application No. 60/153,376, filed on Sep. 10, 1999.

(51) Int. Cl.[7] .................................................. H01H 3/26
(52) U.S. Cl. .................... 307/140; 307/10.1; 361/62; 361/63; 361/64; 361/66
(58) Field of Search ................................ 307/140, 134, 307/10.1; 361/62, 63, 64, 66

(56) References Cited

U.S. PATENT DOCUMENTS

| | | | |
|---|---|---|---|
| 4,088,940 A | | 5/1978 | Ciarniello et al. |
| 4,137,557 A | | 1/1979 | Ciarniello et al. |
| 4,831,509 A | * | 5/1989 | Jones et al. ............. 364/167.01 |
| 5,296,797 A | * | 3/1994 | Bartlett ......................... 320/21 |
| 5,337,013 A | | 8/1994 | Langer et al. |
| 5,708,348 A | * | 1/1998 | Frey et al. ..................... 320/21 |
| 5,798,577 A | | 8/1998 | Lesesky et al. |
| 5,818,673 A | | 10/1998 | Matsumaru et al. |
| 5,856,711 A | | 1/1999 | Kato et al. |
| 5,871,858 A | | 2/1999 | Thomsen et al. |
| 6,195,243 B1 | * | 2/2001 | Spencer et al. ................ 361/64 |
| 6,281,598 B1 | * | 8/2001 | King et al. ................. 307/10.1 |

FOREIGN PATENT DOCUMENTS

JP 02023040 A * 1/1990

* cited by examiner

Primary Examiner—Gregory J. Toatley, Jr.
Assistant Examiner—Robert L DeBeradinis
(74) Attorney, Agent, or Firm—Westman, Champlin & Kelly, P.A.

(57) ABSTRACT

A method and system for controlling power to a cranking subsystem in a device having a power source is disclosed. The method and system include providing at least one switch and providing at least one controller. The switch is coupled with the power source. The at least one controller is coupled with the switch. The at least one controller is for controlling the at least one switch to be open or closed based on a signature of a behavior of a portion of the device. Thus, power is controlled to the portion of the device based on the signature of the portion of the device. In one aspect, the method and system include monitoring a portion of the device to determine a behavior of the portion of the device. In this aspect, the method and system include comparing the behavior of the portion of the device to a signature for the portion of the device. The method and system also include utilizing the at least one controller to operate at least one switch based on the behavior of the portion of the device and the signature of the portion of the device.

38 Claims, 14 Drawing Sheets

500

510

515

Time

520

Time

SELF-LEARNING POWER MANAGEMENT SYSTEM AND METHOD

This application claims the benefit of Provisional Application Ser. No. 60/153,376 filed Sep. 10, 1999.

FIELD OF THE INVENTION

The present invention relates to devices which may have a limited power supply and more particularly to a method and system for providing power management that is capable of learning the characteristics of the device and managing power based on these learned characteristics.

BACKGROUND OF THE INVENTION

Many systems utilize a power supply which may have a limited capacity. For example, truck tractors, boats, golf carts, and satellites may utilize a battery or other energy storage apparatus for DC electrical power. These devices may have a mechanism for recharging the battery, such as an alternator. However, on occasion these devices operate on the stored power from the battery. For example, a truck tractor typically includes an alternator for generating power, a battery for storing power, and various subsystems which may consume power. These power consumers include a cranking system; lights; computers; communication devices electronics for the engine, brakes, steering and other subsystems; and comfort devices such as heating cooling, ventilation, refrigeration, microwaves, and televisions. Many of the power consumers can operate on the stored power of the battery alone when the alternator is not generating power.

Breakdown of the electrical system can be the primary cause of failure for many of these devices, such as the tractor trailer. Even where the electrical system is less subject to malfunctions, breakdown of the electrical system can cause the device to be unable to function. Such a failure of the device may be expensive, both to repair and in other costs absorbed by the user. For example, a failure of the electrical system which drains the battery of a truck tractor may be costly not only because the truck tractor must be towed to another location and repaired, but also because time and perishable cargo may be lost. Consequently, the ability to predict, diagnose, and avoid such failures is desirable.

Mechanisms for avoiding such failure are disclosed in U.S. Pat. No. 5,871,858 by Thomsen et al. ("Thomsen") and U.S. Pat. No. 5,798,577 by Lesesky et al. ("Lesesky"). Thomsen and Lesesky treat one problem that has been diagnosed in devices such as a truck tractor, the problem of overcranking. Consequently, Thomsen discloses cutting off power to the cranking system of a truck tractor when the current flowing and time for which the current flows exceed a particular level. Similarly, Lesesky discloses cutting off power to the cranking system of a truck tractor when a user has provided a cranking signal for greater than a particular time. Furthermore, Thomsen treats the problem of theft using solid state switches controlled using a micro-computer and a code input by a user. Based on whether a code is provided to the system, whether the internal temperature of a switch is above a particular value, and whether a particular current has been provided for a particular time, Thomsen allows power to be provided to the cranking motor.

However, it would still be desirable to be capable of diagnosing impending failures, avoiding failures, providing power to consumers in a more optimal manner. Accordingly, what is needed is a system and method for providing intelligent power management. The present invention addresses such a need.

SUMMARY OF THE INVENTION

The present invention provides method and system for controlling power to a cranking subsystem in a device having a power source. The method and system comprise providing at least one switch and providing at least one controller. The switch is coupled with the power source. The at least one controller is coupled with the switch. The at least one controller is for controlling the at least one switch to be open or closed based on a signature of a behavior of a portion of the device. Thus, power is controlled to the portion of the device based on the signature of the portion of the device. In one aspect, the method and system comprise monitoring a portion of the device to determine a behavior of the portion of the device. In this aspect, the method and system comprise comparing the behavior of the portion of the device to a signature for the portion of the device. In this aspect, the method and system also comprise utilizing the at least one controller to operate at least one switch based on the behavior of the portion of the device and the signature of the portion of the device.

According to the system and method disclosed herein, the present invention is capable of comparing the behavior of portions of the device to the correct, expected behavior as evidenced by the signature. Power can then be controlled based on the behavior of the portion of the device and the signature, allowing problems to be diagnosed early and catastrophic failures prevented.

DETAILED DESCRIPTION OF THE INVENTION

Figure 1A:
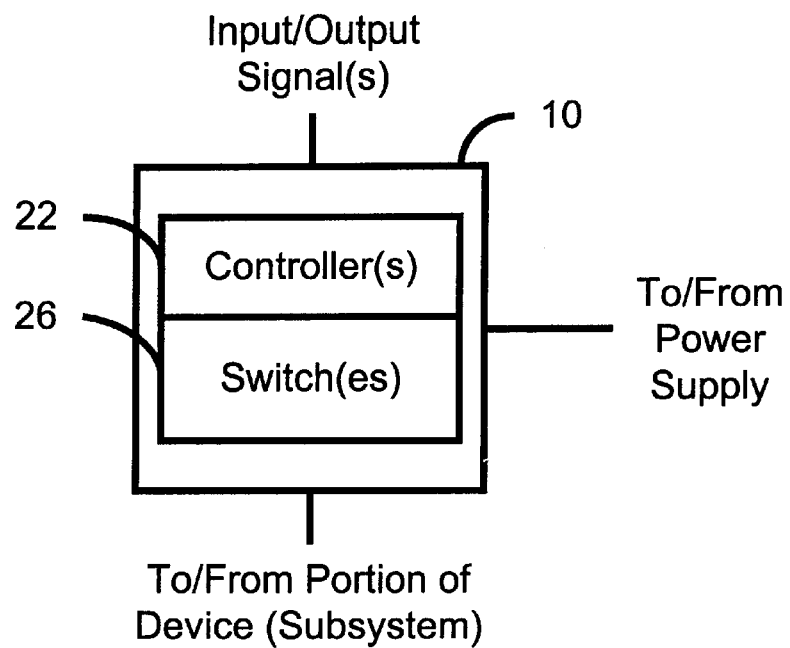
FIG. 1A is a high-level block diagram of one embodiment of an intelligent power management system in accordance with the present invention.

The present invention relates to an improvement in power management technology, particularly for DC electrical power sources which may have limited capacity. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides method and system for controlling power to a cranking subsystem in a device having a power source. The method and system comprise providing at least one switch and providing at least one controller. The switch is coupled with the power source. The at least one controller is coupled with the switch. The at least one controller is for controlling the at least one switch to be open or closed based on a signature of a behavior of a portion of the device. Thus, power is controlled to the portion of the device based on the signature of the portion of the device. In one aspect, the method and system comprise monitoring a portion of the device to determine a behavior of the portion of the device. In this aspect, the method and system comprise comparing the behavior of the portion of the device to a signature for the portion of the device. In this aspect, the method and system also comprise utilizing the at least one controller to operate at least one switch based on the behavior of the portion of the device and the signature of the portion of the device.

Thus, the present invention is capable of comparing the behavior of portions of the device to the correct, expected behavior as evidenced by the signature. The present invention then controls power based on the behavior of the portion of the device and the signature. Thus, problems can be diagnosed early and catastrophic failures prevented.

The present invention will be described in terms of a particular configuration and particular devices. However, one of ordinary skill in the art will readily recognize that this method and system will operate effectively for other configurations, including other connections with power sources and power consumers. Furthermore, one of ordinary skill in the art will readily recognize that the present invention can be used in a variety of other devices, such as satellites, boats, or other devices.

To more particularly illustrate the method and system in accordance with the present invention, refer now to 1A, which depicts a high-level block diagram of one embodiment of an intelligent power management system, or power management module ("PMM") 10 in accordance with the present invention. The PMM 10 depicted is essentially an intelligent to switch which can be considered to include at least a controller 22 and switches 26. The controller 22 and switches 26 are preferably integrated together in a single module. The switches 26 are preferably solid state devices such as MOSFET switches. The controller 22 is preferably a programmable microcomputer. Thus, the controller 22 may be individually tailored for functions desired by a user of the PMM 10. The controller 22 can receive input signals in order to aid in controlling the switches 26. For example, the controller 22 can receive signals from a device with which the PMM 10 is being used or from internal sensors which may be coupled to one or more of the switches 26. The switches 26 are coupled with a power supply and a portion of the device, such as a subsystem. Thus, depending upon whether a particular switch 26 is closed, power may be provided to a subsystem of the device. Using the intelligence in the controller 22 and the switches 26, the PMM 10 can control the switching of power to portions of the device in which the PMM 10 is used. Thus, the PMM 10 can act as an intelligent switch. As a result, power management in the device can be improved.

Figure 1B:
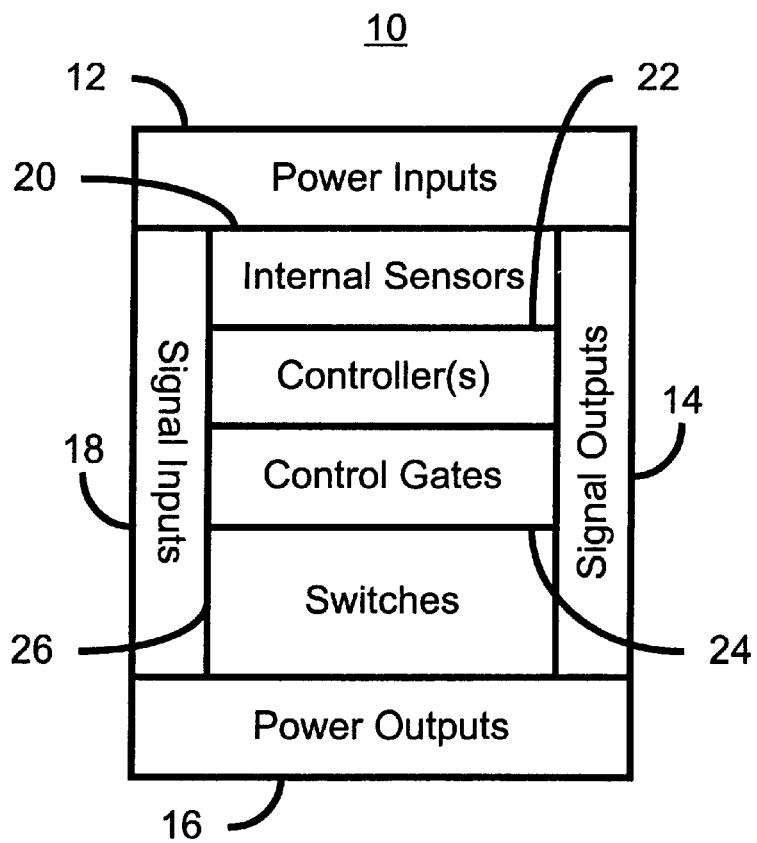
FIG. 1B is a block diagram of one embodiment of an intelligent power management system in accordance with the present invention.

FIG. 1B depicts a more detailed diagram of one embodiment of an intelligent power management system, or PMM 10, in accordance with the present invention. The PMM 10 includes power input 12, power output 16, signal inputs 18, signal outputs 14, internal sensors 20, a controller 22, switches 26 and, preferably, control gates 24 for the switches 26. The switches 26 are preferably devices such as MOSFET switches. The controller 22 is preferably a programmable microcomputer. Thus, the controller 22 may be individually tailored for functions desired by a user of the PMM 10. The controller 22 can communicate with portions of the device in which the PMM 10 is used via the signal input 18 and signal output 14. Thus, the controller can receive signals from a device with which the PMM 10 is being used through the signal input 18. Furthermore, the controller 22 can provide data and commands to the device through the signal output 14. The internal sensors 20 monitor the condition of the PMM 10. For example, the internal sensors 20 could include temperature sensors for various portions of the PMM 10, such as the switches 26, as well as current and voltage sensors for the switches 26. The internal sensors 20 may also include a timer, or clock, (not explicitly shown in FIG. 1B). In a preferred embodiment, the internal sensors 20 include temperature, voltage, and current sensors for each of the switches 26.

Figure 1C:
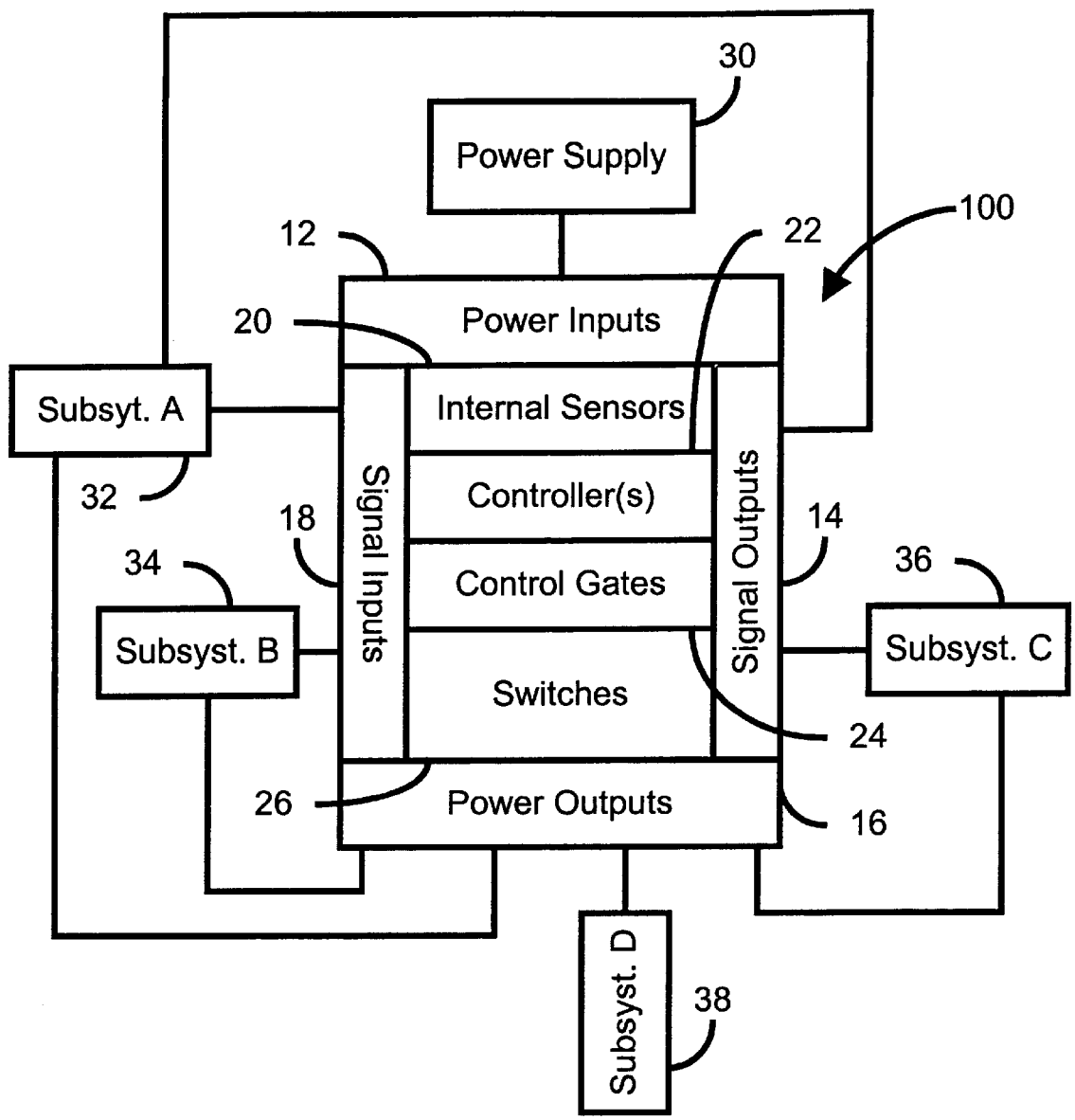
FIG. 1C is a block diagram of one embodiment of the intelligent power management system as coupled with a device.

FIG. 1C depicts an embodiment of the PMM 100 coupled with subsystems of a device. The PMM 100 is preferably the same as the PMM 10, though components are numbered differently. The PMM 100 still includes the signal input 18, the signal output 14, the power input 12, the power output 16, the internal sensors 20, the controller 22 and switches 26. Not depicted are the control gates 24 which may be provided. The PMM 100 is coupled to a power supply 30 through the power input 12. The power supply 30 includes at least one or more power storage devices (not explicitly shown), such as a battery, and may also include power generating devices (not explicitly shown), such as one or more alternators. In a preferred embodiment, the PMM 100 is separately coupled to the alternator and battery. The PMM 100 receives signals from subsystem A 32 and subsystem B 34 through the signal input 18. The PMM 100 provides signals to subsystem A 32 and a subsystem C 36 using the signal output 14. The PMM 100 is also coupled to subsystem A 32, subsystem B 34, subsystem C 36 and subsystem D 38. The PMM 100 is capable of a variety of functions, including but not limited to one or more of the following: managing the generation and storage of power, monitoring and controlling power consumption, cutting off power to one or more consumers based on a variety of programmable factors, providing step down power conversion of the power supplied by the power source 30, providing protection against spikes, providing protection against shorts, providing reverse polarity protection, providing a self learning capability, learning the signatures of one or more subsystems, diagnosing potential failures based on the signatures of one or more subsystems, protecting against potential failures based on the signatures of one or more subsystems, and protecting against drainage of the power source 30.

Figure 1D:
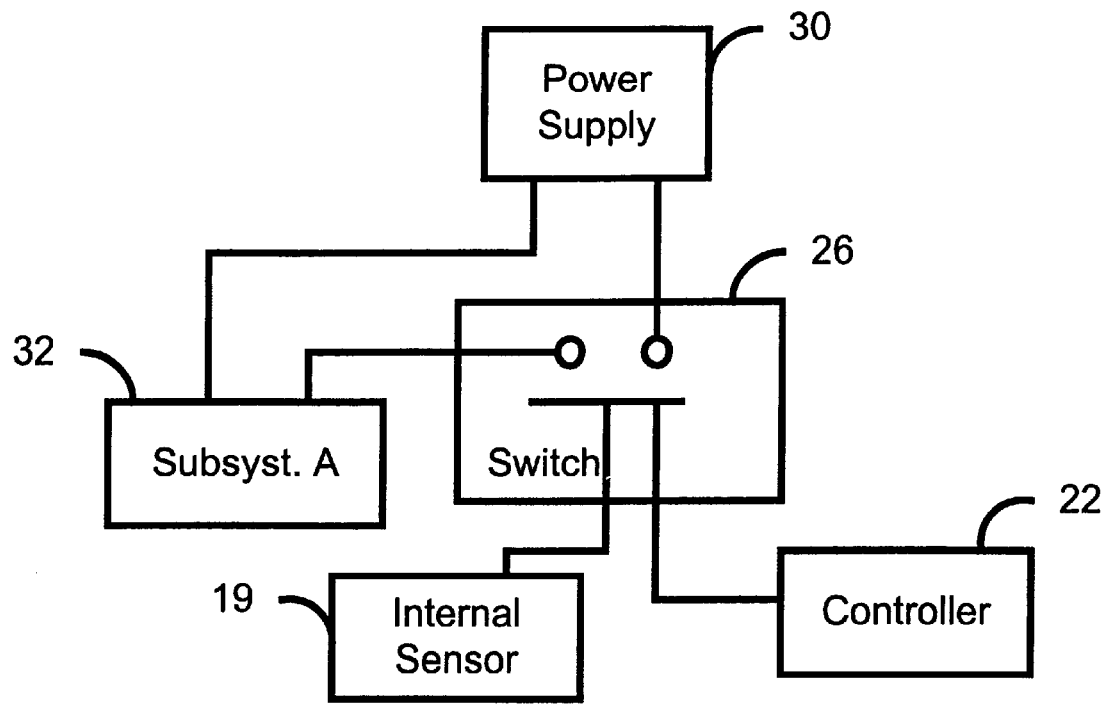
FIG. 1D is a block diagram of one embodiment of the intelligent power management system as coupled with a device.

FIG. 1D depicts one embodiment of a portion of the PMM 10 or 100 and the device to which the PMM 10 is coupled. The switch 26, which is one of the switches of the PMM 10, is connected between the power supply 30 of the device and the subsystem A 32 of the device. Consequently, when the switch 26 is open, as depicted in FIG. 1D, no power is provided to the subsystem A 32. However, when the switch 26 is closed, power is provided to the subsystem A 32. Also depicted are the controller 22 and internal sensor 19 coupled with the switch 26. Other or different components internal to the PMM 10 or 100 can be coupled with the switch 26. For example, in a preferred embodiment, current, voltage and temperature through the switch 26 are also monitored. The internal sensor 19 provides to the controller 22 an electrical signal indicating a property of one or more of the switches 26. Using the signal from the internal sensor 19 and/or other signals input to the controller 22 and based on the instructions provided to the controller 22, the controller 22 can control the switch to be open or closed.

Figure 1E:
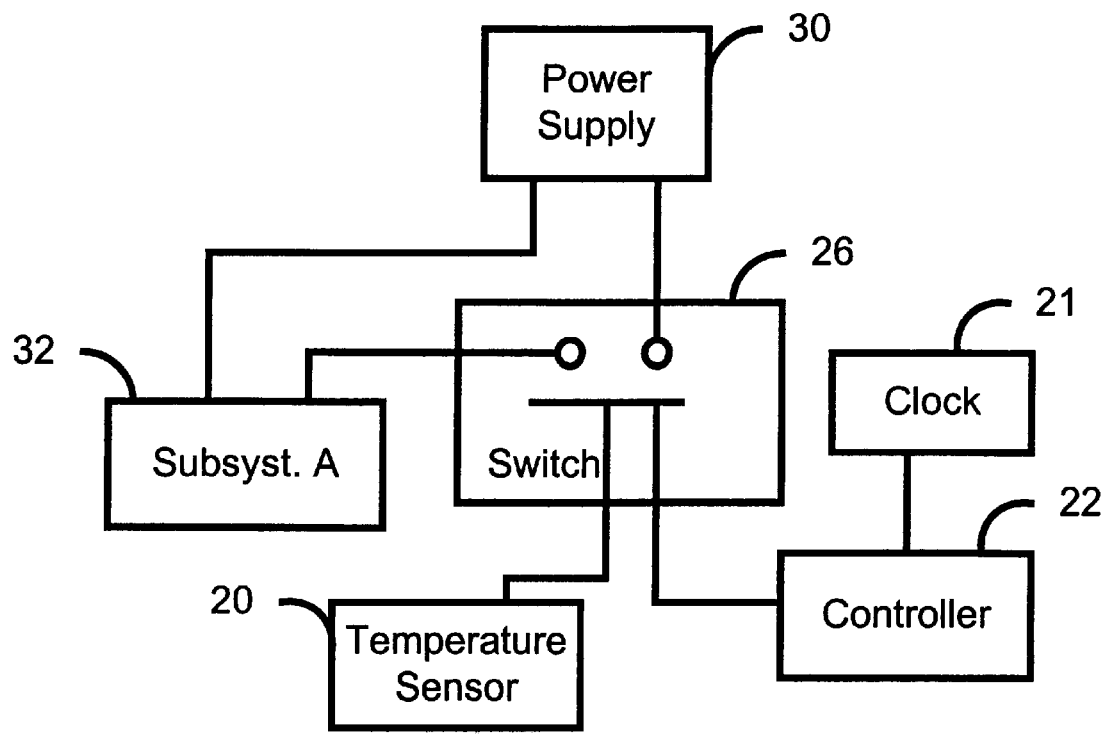
FIG. 1E is a block diagram of one embodiment of how a switch of the intelligent power management system is coupled with a portion of a device.

FIG. 1E depicts one embodiment of a portion of the PMM 10 or 100 and the device to which the PMM 10 or 100 is coupled. The switch 26, which is one of the switches of the PMM 10, is connected between the power supply 30 of the device and the subsystem A 32 of the device. Consequently, when the switch 26 is open, as depicted in FIG. 1E, no power is provided to the subsystem A 32. However, when the switch 26 is closed, power is provided to the subsystem A 32. Also depicted are the controller 22, temperature sensor 20 and clock 21 coupled with the switch 26. Other or different components internal to the PMM 10 or 100 can be coupled with the switch 26. For example, in a preferred embodiment, current and voltage through the switch 26 are also monitored. The temperature sensor 20 is thermally coupled with the switch 26 and coupled with the controller 22. Preferably, the temperature sensor 20 provides to the controller 22 an electrical signal indicating the temperature of the switch 26. The clock 21 is coupled to the controller 22 and can provide an indication of how long the switch 26 has been open or closed.

Figure 1F:
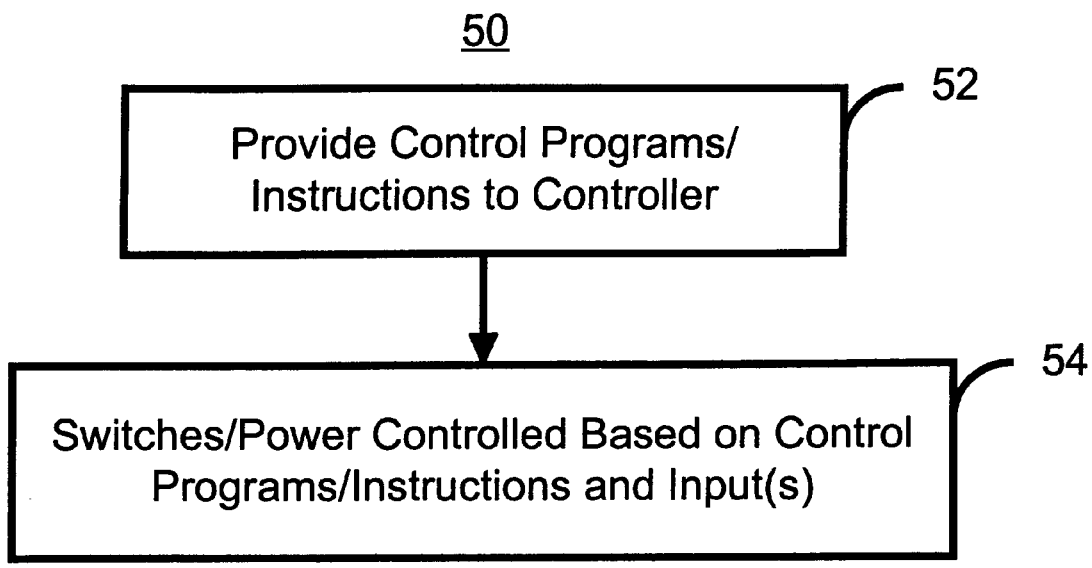
FIG. 1F is a high level flow chart of the functions of the power management module in accordance with the present invention.

FIG. 1F depicts a high-level flow chart of one embodiment of a method 50 for using the PMM 10 or 100 in accordance with the present invention. One or more control programs are provided to the controller 22, via step 52. The controller 22 then controls the power supplied to different power consumers based on the program and other inputs to the PMM 10 or 100, via step 54. Thus, the controller 22 opens or closes the switches 26 under certain conditions. The data provided by the internal sensors 20, an internal clock or information provided by the subsystems of the device that are connected to the signal input 18 inform the controller 22 as to the condition of the PMM 10 or 100 and the device to which the PMM 10 or 100 is connected. The PMM 10 or 100 can use this data with the instructions provided in the controller in order to determine when to open or close the switches 26. For example, the PMM. 10 or 100 can determine whether the data meet certain criteria and operate the switches 26 accordingly.

To further illustrate the structure, functions, and capabilities of the present invention, reference will be made to the use of a PMM in the context of a particular device, a truck tractor. However, one of ordinary skill in the art will readily realize that analogous or functions may be provided by a PMM in other devices.

Figure 2A:
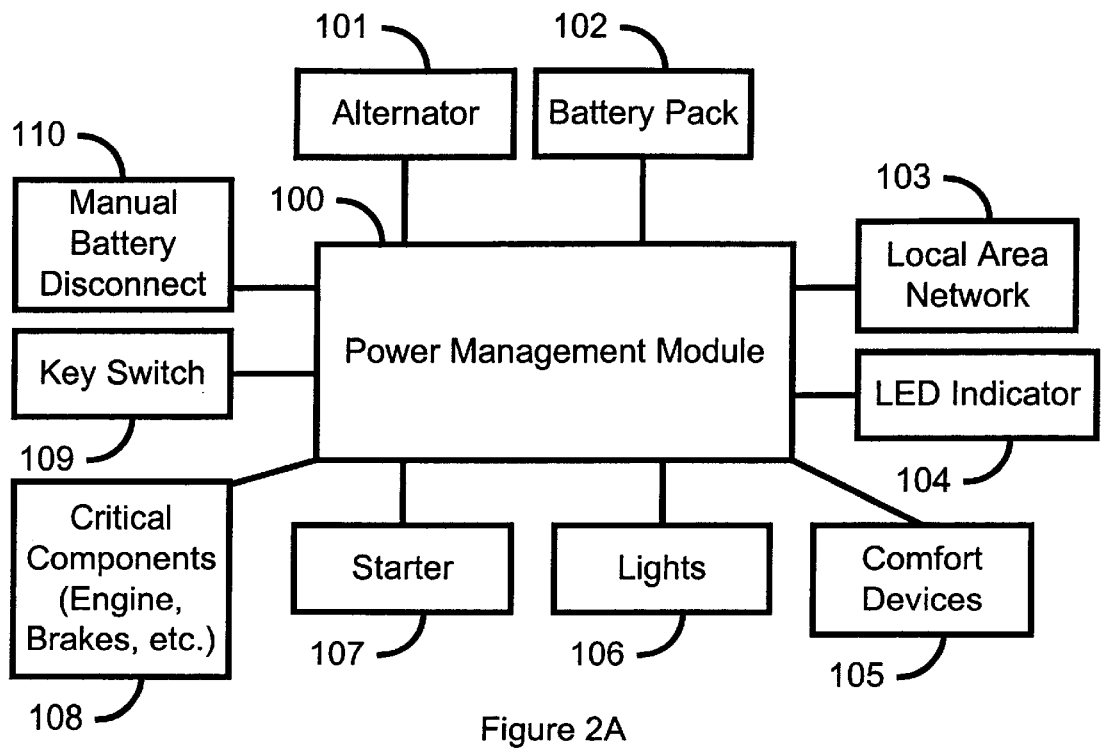
FIG. 2A is a high-level block diagram of one embodiment of a power management module in accordance with the present invention is used in a truck tractor.

FIG. 2A depicts a PMM 100 as it is coupled with subsystems in a truck tractor. Although numbered differently, components of the PMM 100 shown in FIG. 2A correspond to similarly named components in the PMM 10 shown in FIGS. 1A–E. Referring back to FIG. 2A, for clarity, the ensuing discussion utilizes the PMM 100. The truck tractor includes two power supplies, an alternator 101 which generates power and a battery pack 102 which stores power. The truck tractor also includes various subsystems such as a local area network 103, and LED indicator 104, comfort devices 105, lights 106, a starter 107, critical components 108, a start key switch 109 and a manual battery disconnect switch 110. The comfort devices 105 may include components such as a radio, refrigerator, or other devices. The critical components 108 include the engine, brakes, and other components.

Figure 2B:
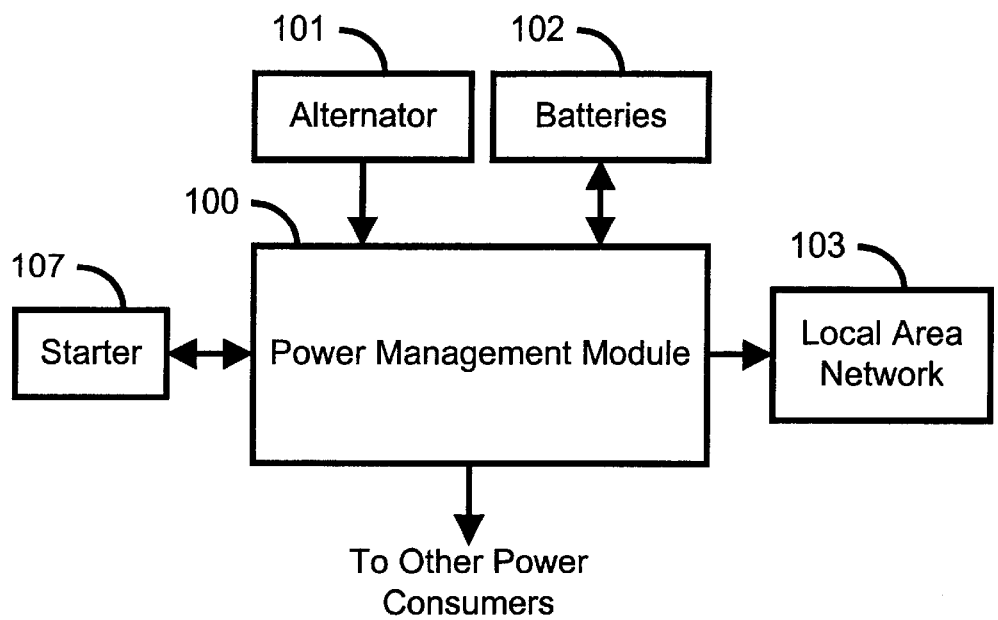
FIG. 2B is another high-level block diagram of one embodiment of a power management module in accordance with the present invention is used in a truck tractor.

FIG. 2B is another high-level diagram of the PMM 100 as coupled with certain subsystems in a device such as a truck tractor. The PMM 100 is depicted as being coupled to the batteries 102 and the alternator 101, the starter 107, other power consumers, and the LAN 103. Based on communication with the batteries 102, alternator 101, and various subsystems of the truck tractor, the PMM 100 can control switches (not explicitly shown in FIG. 2B) within the PMM 100 and can communicate with portions of the truck tractor so that a variety of functions are performed. These functions include but are not limited to those disclosed in the present application. As depicted in FIG. 2B, the PMM 100 may recognize differing power requirements for the batteries 102 under different conditions and determine the power drawn by the subsystems of the truck tractor. For example, the PMM 100 may recognize the ideal charge for the batteries 102 over a range of battery temperatures, battery capacity, and various requirements of the starter, such as voltage and current. The PMM 100 may also communicate with the batteries 102 to determine the remaining life in the batteries 102. Consequently, the PMM 100 may control other portions of the truck tractor and the power provided to the batteries 102 to meet the requirements of the batteries 102. Thus, the PMM 100 may ensure that the batteries 102 are charged close to the ideal level and may regulate power to power consumers to extend the life of the batteries 102 or ensure that the batteries 102 have sufficient power for critical applications. Consequently, the PMM 100 may identify and prevent potential failure of the batteries 102. The PMM 100 also receives signals from and provides signals to the alternator 101. Thus, potential failures of the alternator 101 or harm due to problems within the alternator 101 or other portions of the truck tractor may be prevented. The output of the alternator 101 may also be controlled based on signals provided from the PMM 100, for example to optimize battery power. In addition, switches between the alternator 101 and other portions of the truck tractor, including the batteries 102, may be provided. The PMM 100 may control these switches to provide the desired power to other portions of the truck tractor. Furthermore, the PMM 100 communicates with the starter (cranking) subsystem 107, identifying impending failure and preventing harm to the starter 107 due to system failure or user abuse. The power to the starter 107 may also be controlled based on other factors, such as the power remaining in the batteries 102 or the temperature of switches in the PMM 100. The PMM 100 also communicates with the LAN 103 for the truck tractor and other power consumes. Information relating to the status of the truck tractor may be communicated between the LAN 103 and the PMM 100. In addition to communicating with various other subsystems, the PMM 100 may control each subsystem's power consumption. For example, the PMM 100 may cut off power to the subsystems or reduce power to the subsystem. The PMM 100 may also control power to the subsystems to ensure that power in the batteries 102 or alternator 101 exists for critical needs and to ensure that the subsystems receive the appropriate amount of power. The PMM 100 may also monitor the subsystems to prevent harm from short circuits, spikes, or failures. The PMM 100 can also control and regulate power output to power sensitive devices, such as light bulbs.

Figure 3:
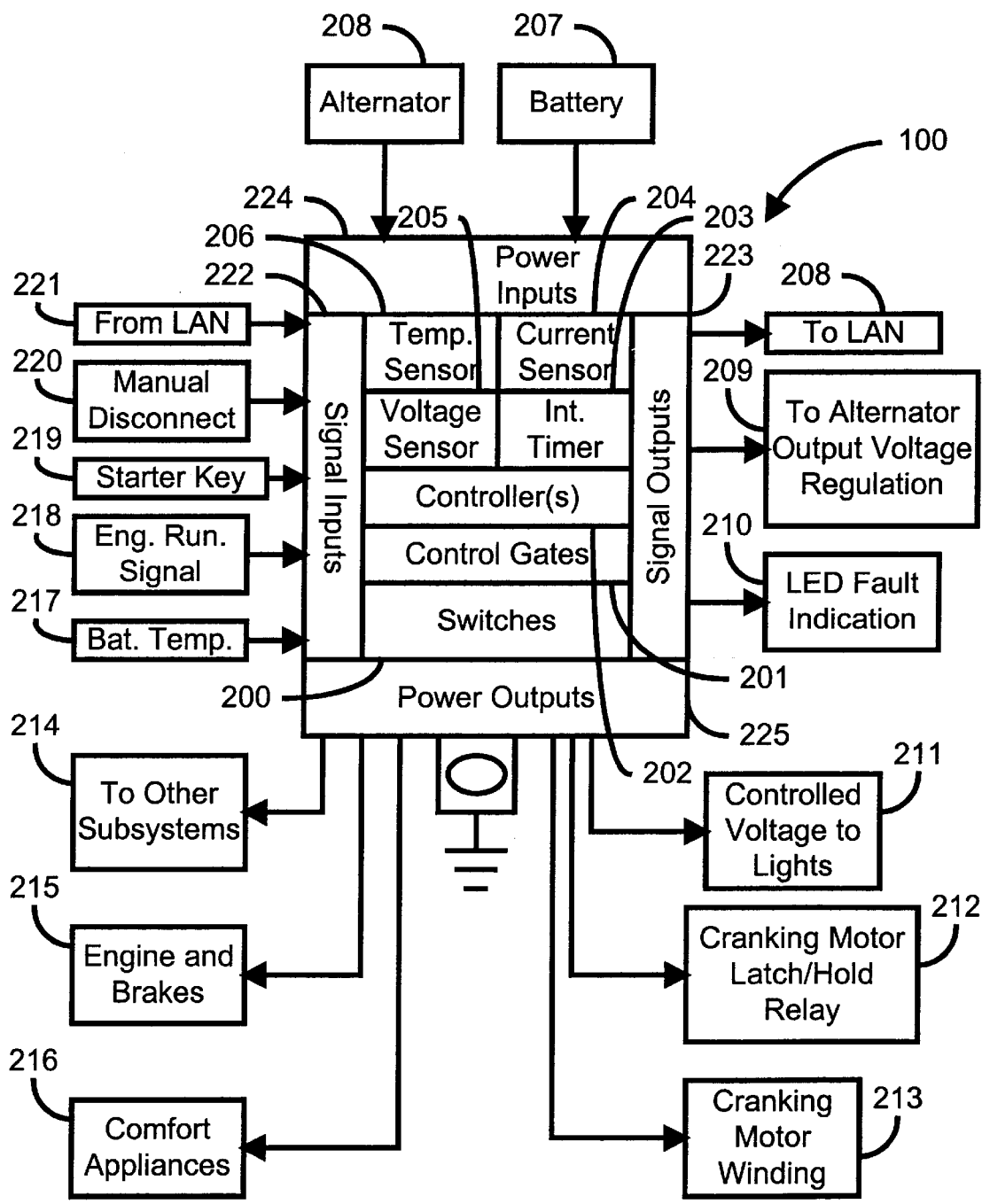
FIG. 3 is a more detailed block diagram of one embodiment of a power management module in accordance with the present invention is used in a truck tractor.

FIG. 3 more particularly illustrates the connections between the PMM 100 and subsystems of the truck tractor. Although numbered differently, components of the PMM 100 shown in FIG. 3 correspond to similarly named components in the PMM 100 shown in FIG. 2A. Referring back to FIG. 3, the PMM 100 includes signal inputs 222, signal outputs 223, power inputs 224 and power outputs 225. The PMM 100 also includes MOSFET switches 200, control gates 201 and a controller 202. The control gates 201 control the switches 200. The controller 202 controls the control gates 201 and, therefore, controls the switches 200. The controller 202 is preferably a programmable microcomputer. The PMM 100 also includes an internal timer 203, current sensors 204, voltage sensors 205 and temperature sensors 206. The current sensors 204, voltage sensor 205, and temperature sensors 206 monitor the current through, voltage across and temperature of, respectively, the switches 200. Preferably each of the switches 200 includes a current sensor 204, a voltage sensor 205, and a temperature sensor 206. In addition, the PMM 100 includes components for monitoring various portions of the truck tractor. For example, the PMM 100 may monitor the voltage across and current through certain power consumers and may monitor the charge level, rate of charge and rate of discharge of the battery 207.

The PMM 100 is coupled to two power supplies, battery 207 and the alternator 208. The PMM 100 receives signals from a local area network (LAN) line 221, a manual disconnect line 220, a starter key line 219, an engine running signal line 218, and a battery temperature sensor line 217 provided from a LAN (not shown), a manual disconnect switch (not shown), a starter key (not shown), an sensor indicating whether the engine is running (not shown) and a battery temperature sensor (not shown), respectively. The PMM 100 provides signals to a LAN, the alternator 208, and an LED via a communication to LAN line 221, a input to alternator output voltage regulation line 209, and an LED fault indication line 210. Consequently, the PMM 100 can receive data from, provide data to, and provide commands to different subsystems of the truck tractor. For example, the manual disconnect line 220 indicates whether the battery 207 and alternator 208 should be cut off by the PMM 100. The starter key line 219 indicates whether a user has turned a starter key to start up the engine of the truck tractor. The engine running signal line 218 indicates to the PMM 100 whether the engine is already running, allowing the PMM 100 to prevent power from flowing to the cranking subsystem when the engine is already on. The PMM 100 can monitor the temperature of the battery via line 217, and can monitor the voltage across the battery 207, for example to control charging of the battery 207. Furthermore, the PMM 100 can control output of the alternator 208 through the input to alternator output voltage regulation line 209. The PMM 100 can also indicate to the user if a fault has occurred via LED fault indication line 210. The temperature sensors 206 provide an indication of the temperature of the switches 200. This allows the controller to open one or more of the switches when their temperature is too high.

A typical alternator, such as the alternator 208, is three-phase alternating current generator. The rectifier circuit (not shown) in the alternator 208 converts alternating current (AC) to direct current (DC). Important components in the rectifier are diodes. When a diode or other component fails in one phase of the alternator 208, the alternator 208 will generate only two-thirds of the power. This will put significant stress on the two working phases of the alternator 208. This leads to quick and progressive failure of all phases of the alternator 208. Currently, conventional devices in the market place cannot detect the loss of a phase and prevent the rapid and eminent failure of the other phases. The PMM 100 can detect the loss of a phase through alternator signature recognition. In response, the PMM 100 can reduce the demand on the alternator 208. This will give time to fix the alternator at the next scheduled maintenance rather failing unexpectedly on a high way where the maintenance and downtime costs are excessive.

The alternator 208 has both stator and rotor windings. Any one of these windings can develop electrical short or open condition. When shorted or open condition develops, the alternator 208 will generate reduced electrical power. This will put significant stress on windings that are normal. Progressive failure of other components rapidly follows. Currently no conventional devices detect a short or open condition to prevent the failure of other components. The PMM 100 can detect the loss of a phase through alternator signature recognition, and reduces the demand on alternator 208. This will give time to fix the alternator 208 at the next scheduled maintenance rather failing unexpectedly, resulting in excessive maintenance and downtime costs.

Furthermore the PMM can detect and account for the failure of the belt and pulley system driving the alternator. When the belt or pulley slips, the alternator cannot generate power that it is designed to generate. The slip condition heats up the belt, pulley, alternator bearings and other portions of the truck tractor. The PMM 100 can detect the existence of these conditions, using communication with the truck tractor and monitoring the difference between the behavior of the alternator and its signature. PMM can then take appropriate action, for example by providing an alarm to the user.

The PMM 100 can also monitor the power consumers and supplies. Thus, the PMM 100 is coupled with several subsystems that act as power consumers. For example, the PMM 100 is coupled with the lights, a cranking motor latch/hold coil, a cranking motor winding, other devices in the truck tractor, the engine and brakes, and comfort appliances via the lights line 211, a cranking motor latch/hold coil line 212, a cranking motor winding line 213, other devices in the truck tractor line 214, engine and brakes line 215, and comfort appliances line 216. Thus, in the embodiment shown in FIG. 3, the PMM 100 is coupled to the cranking subsystem through two lines 212 and 213. Using the lines 211, 212, 213, 214, 215, and 216, the PMM 100 can monitor and control power to various subsystems of the truck tractor, such as the lights, components of the cranking subsystem, the engine and brakes, comfort appliances, and other subsystems. For example, the PMM 100 can provide pulse width modulation (PWM) to control the magnitude of the power supplied to a particular subsystem. Thus, the voltage applied to the lights, the engine, and the brakes can be decreased as desired to extend the life of or better control components. The PMM 100 can also monitor and regulate the demand on the alternator, preferably by using PWM. For example, when the engine is started when the whether is cold, the battery charge is low and the power use is high, the electrical system will try to draw as much current as possible from the alternator 208 instantaneously. This condition puts high stress on and reduces the life of the alternator 208. The PMM 100 monitors and regulates the demand on the alternator 208 such that the stress on alternator is moderated and maintained at an optimum level. This is accomplished through PWM of alternator output.

The PMM 100 is also capable of keeping track of these information for various components such as starter (cranking subsystem), battery 207, alternator 208, light bulbs and others subsystems. Knowing the cycles and severity of operation is the accurate way of knowing the actual usage of these components. By knowing this, most optimum maintenance schedule can be used. This will avoid servicing or changing components before its time. This will also help to avoid not serving or changing components when it is time.

In addition to the above mentioned functions, the PMM 100 in accordance with the present invention may learn the properties of particular subsystems and diagnose potential failures. Subsystems, which can include individual components, typically have individual current and voltage characteristics as a function of time. Based on these characteristics, the PMM 100 can control the power supply to diagnose impending failure and take action against such failure, such as cutting power or providing an alarm to a user.

Figure 4A:
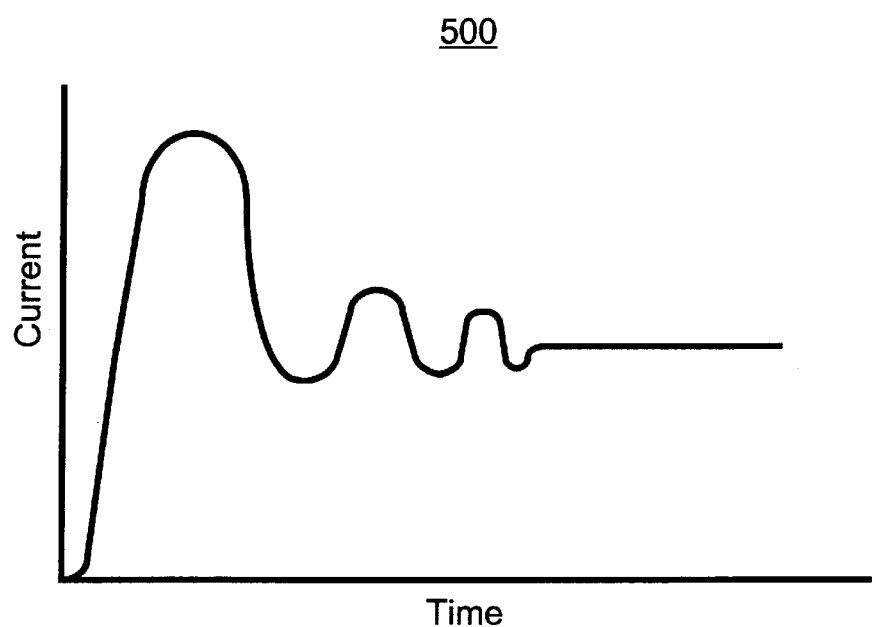
FIG. 4A depicts a typical starter (cranking subsystem) signature.
Figure 4B:
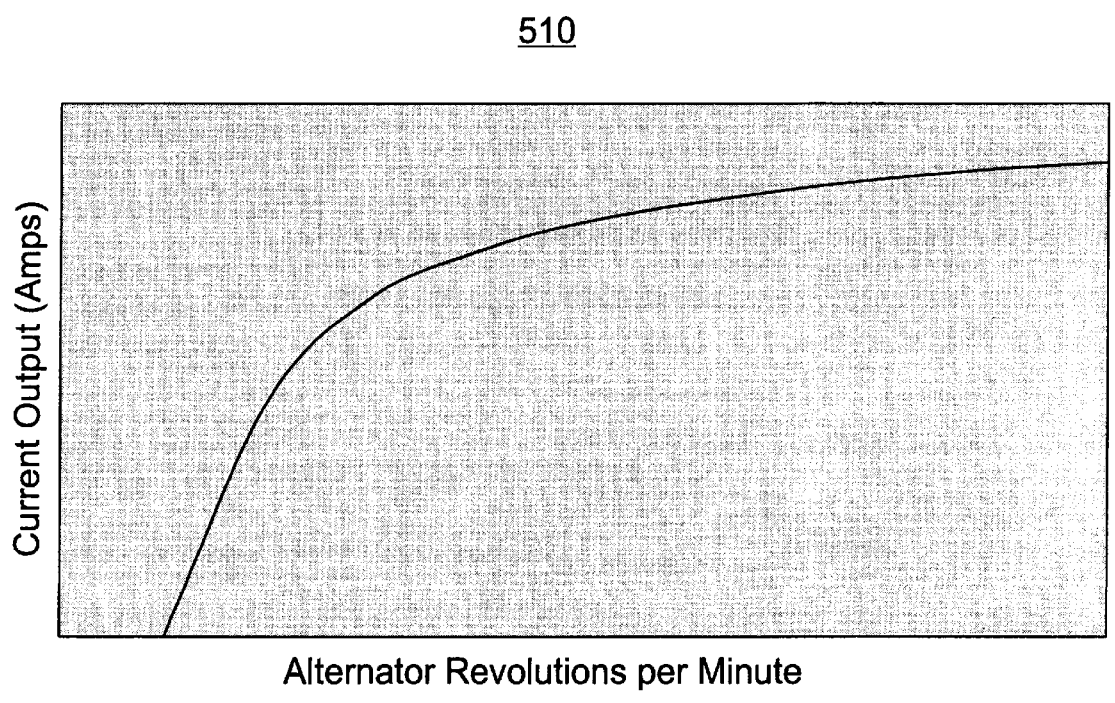
FIG. 4B depicts a typical alternator signature for current versus alternator rotation.
Figure 4C:
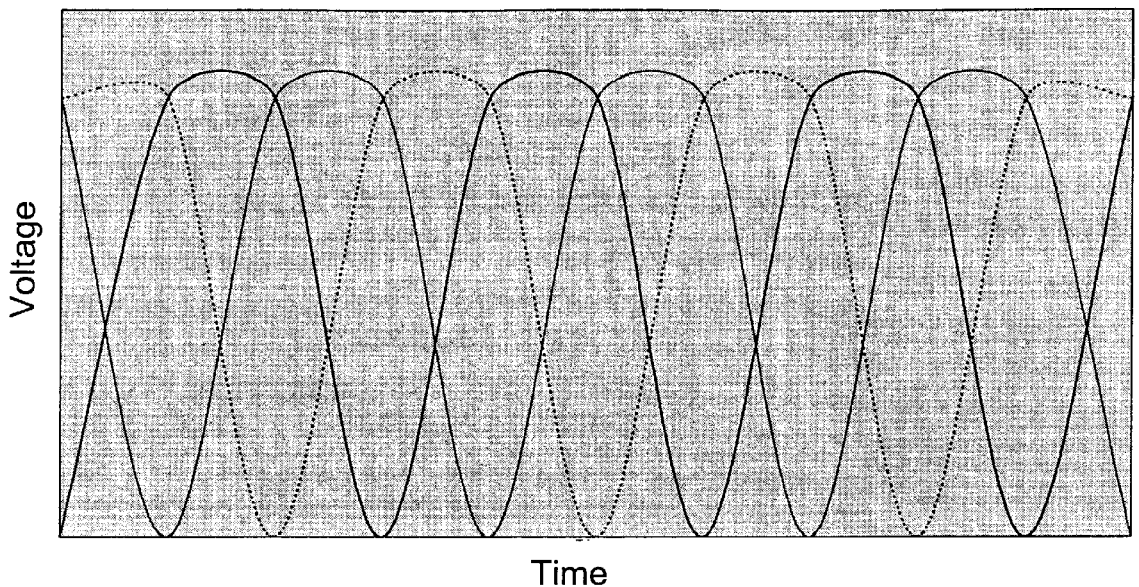
FIG. 4C depicts a typical alternator voltage signature.

FIG. 4A depicts a typical starter (cranking subsystem) signature 500. FIG. 4B depicts a typical alternator current signature 510. FIG. 4C depicts a typical alternator voltage signature 515. Furthermore, other signatures can be used. Signatures from other subsystems or components of the truck tractor can also be obtained. Each signature is a measure of the normal behavior of the corresponding device. These signatures can be provided to the PMM 100. For example, the signatures 500, 510 and 515 might be provided to the controller of the PMM 100 when the software is loaded in step 52 of the method 50 depicted in FIG. 1F. Referring back to FIGS. 4B and 4C, the PMM 100 can learn these signatures 500, 510 and 515 by sampling the cranking subsystem and alternator. Default initial signatures, which the PMM 100 can replace with learned signatures, can also be provided to the PMM 100. Based on the signatures, the PMM 100 can diagnose and take action on potential problems.

Figure 4D:
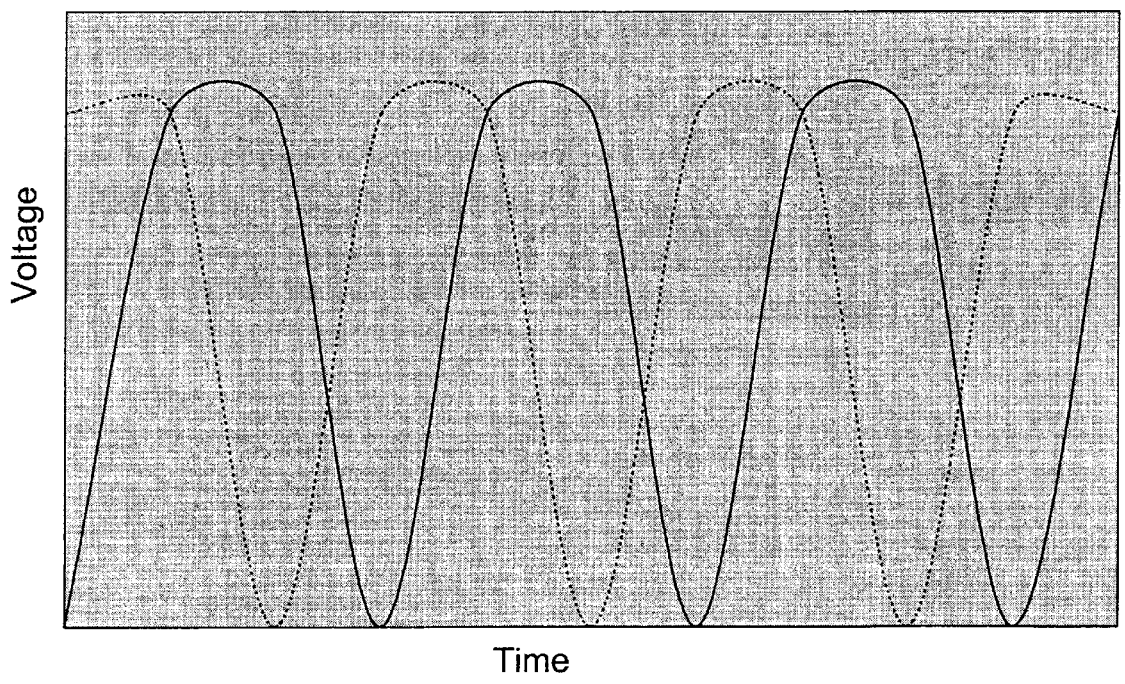
FIG. 4D depicts alternator voltage behavior when a phase has failed.

For example, FIG. 4D depicts an alternator voltage signal 520 that occurs when the alternator has a phase missing. A comparison of the normal alternator voltage signal 515 of FIG. 4C and the alternator voltage signal 520 occurring when there is a fault results in a difference between the signatures. Using the method described below, the PMM 10 or 100 can diagnose the failure of the alternator using signatures, such as the signatures 515 and 520.

Figure 5A:
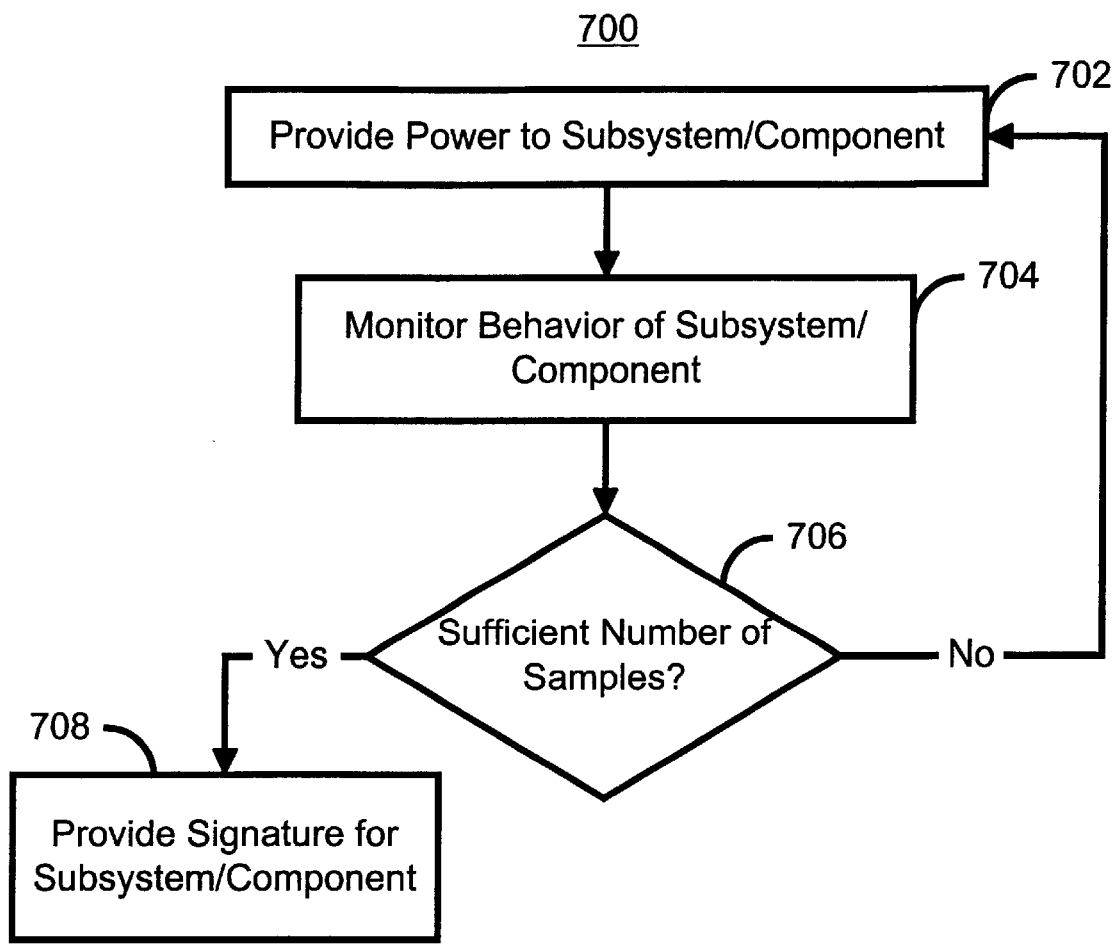
FIG. 5A depicts one embodiment of a method for learning the signatures of a subsystem using the power management module in accordance with the present invention.

FIG. 5A depicts an embodiment of a method 700 for learning the signatures of a subsystem using the PMM 100 in accordance with the present invention. Preferably, the method 700 is performed around the time of manufacture of the truck tractor. Although the method 700 is described in the context of a single subsystem or component, the method 700 may be carried out in parallel for multiple subsystems or components. Power is provided to the subsystem or component from which a signature is to be obtained, via step 702. Step 702 may be performed by closing the appropriate switch in the PMM 100 which allows the power supply to be connected to the component or subsystem. However, that for the alternator or battery, a switch in the PMM 100 may not be utilized. The behavior of the subsystem or device is then monitored, via step 704. Step 704 preferably includes determining the current and voltage characteristics for the subsystem or component for a particular time. The time for which the subsystem or component is monitored may depend upon the characteristics of the subsystem or component. For example, the cranking subsystem may be monitored for thirty seconds, while another component or subsystem may be monitored for more or less time. It is then determined whether a sufficient number of samples have been obtained, via step 706. A sufficient number of samples can be determined by a user, and in one embodiment is fifty samples. If a sufficient number of samples has not been obtained, then the method returns to step 702. In one embodiment, the method 700 may also calculate the current signature, based on the (insufficient) number of samples, and return to step 702 to monitor the behavior of the subsystem. For example, the average of the samples taken so far may be calculated. Furthermore, the current signature based on the (insufficient) number of samples may be used in the method 750, discussed below, or may be combined with a default signature for use in the method 750. If it is determined that a sufficient number of samples have been obtained, then a signature for the component or subsystem is provided, via step 708. In one embodiment, step 708 include providing an average of the samples taken.

Figure 5B:
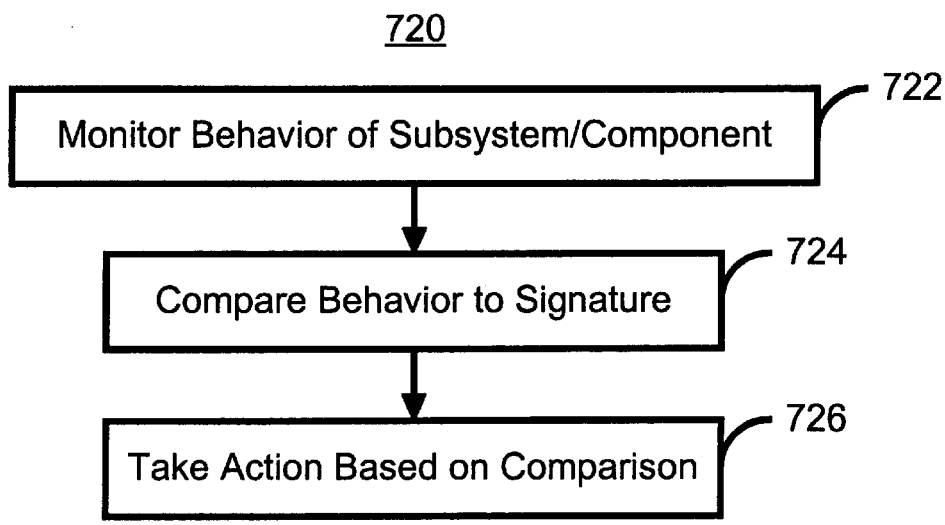
FIG. 5B depicts a high-level flow chart of one embodiment of a method for utilizing the signatures of a subsystem using the power management module in accordance with the present invention.

The PMM 100 also uses the signatures obtained or provided in monitoring the device. FIG. 5B is a high-level flow chart of one embodiment of a method 720 for utilizing the signatures of a subsystem using the PMM 100 in accordance with the present invention. Although the method 720 is described in the context of a single subsystem or component, the method 720 may be carried out in parallel for multiple subsystems or components. The method 720 may be considered to be a special case of carrying out step 54 of the method 50 depicted in FIG. 1E. Referring back to FIG. 5B, the behavior of a subsystem is monitored, via step 722. Step 722 preferably includes determining the current and voltage characteristics for the component or subsystem for a particular time. The time for which the subsystem or component is monitored may depend upon the characteristics of the subsystem or component. For example, the cranking subsystem may be monitored for thirty seconds, while another component or subsystem may be monitored for more or less time. Furthermore, the time for which the behavior is monitored in step 722 is preferably the time for which behavior is monitored in step 704, shown in FIG. 5A. Referring back to FIG. 5B, the signature is then compared to the monitored behavior, via step 724. Based on the comparison between the signature and the monitored behavior, the appropriate action is taken, via step 726. For example, the appropriate switch may be opened, closed, or left open or closed. In addition, an alarm may be provided.

Figure 5C:
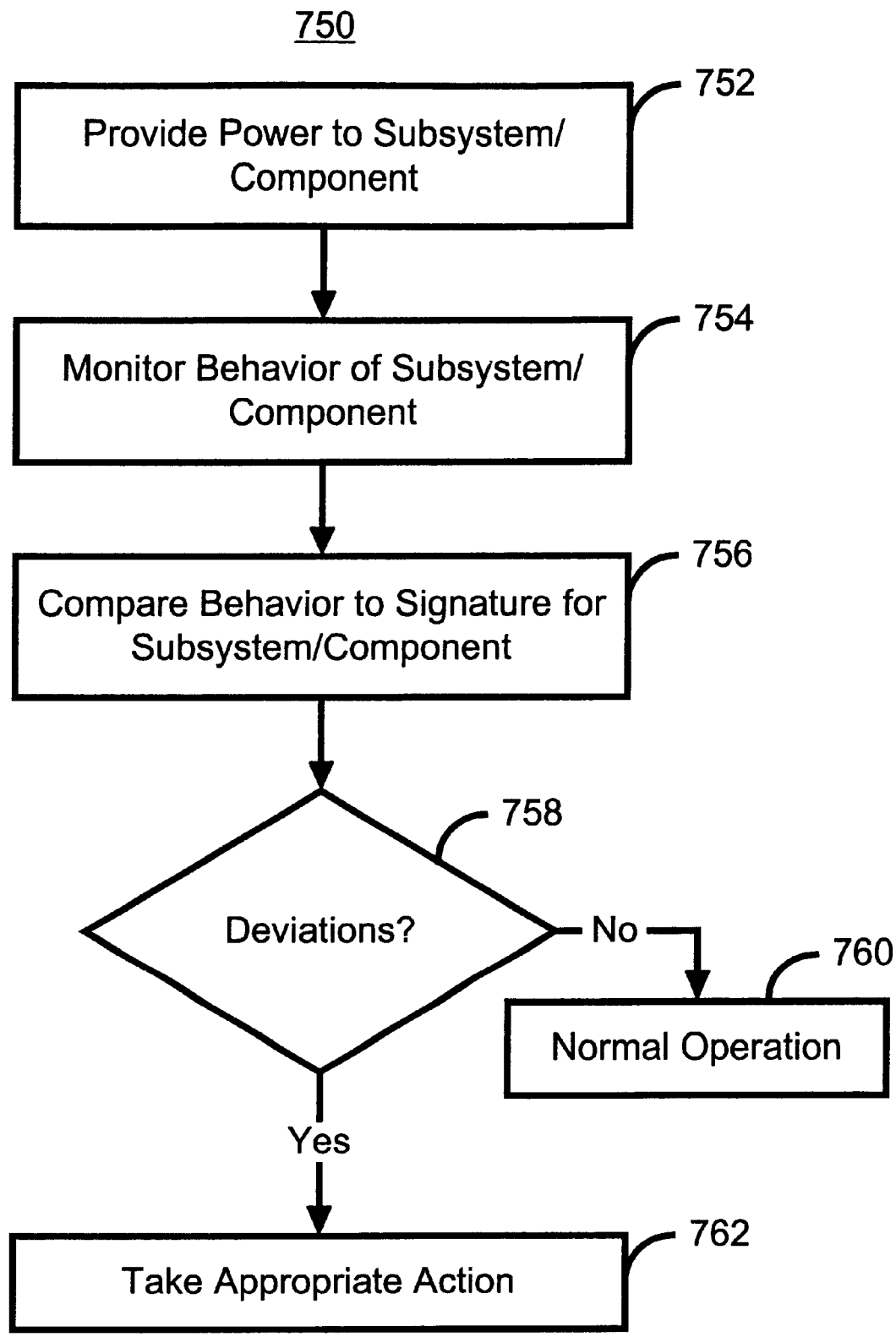
FIG. 5C depicts a more detailed flow chart of one embodiment of a method for utilizing the signatures of a subsystem using the power management module in accordance with the present invention.

FIG. 5C depicts a more detailed flow chart of one embodiment of a method 750 for utilizing the signatures of a subsystem using the PMM 100 in accordance with the present invention. Although the method 750 is described in the context of a single subsystem or component, the method 750 may be carried out in parallel for multiple subsystems or components. The method 720 may be considered to be a special case of carrying out step 54 of the method 50 depicted in FIG. 1F. Referring back to FIG. 5C, power is provided to the subsystem or component to be used, via step 752. Step 752 may be performed by closing the appropriate switch in the PMM 100 which allows the power supply to be connected to the component or subsystem. However, for the alternator or battery, a switch in the PMM 100 may not be utilized because the switch in the PMM 100 may not directly control whether power is provided to the alternator or battery. The behavior of the subsystem or component is then monitored, via step 754. Step 754 preferably includes determining the current and voltage characteristics for the component or subsystem for a particular time. The time for which the subsystem or component is monitored may depend upon the characteristics of the subsystem or component. For example, the cranking subsystem may be monitored for thirty seconds, while another component or subsystem may be monitored for more or less time. Furthermore, the time for which the behavior is monitored in step 754 is preferably the time for which behavior is monitored in step 704, shown in FIG. 5A. Referring back to FIG. 5B, the signature is then compared to the monitored behavior, via step 756. It is then determined whether deviations have occurred from the signature, via step 758. In one embodiment, step 758 measures the size of the deviations and determines whether the deviations are significant enough to take action. If the deviations are not significant enough, then normal operation is continued, via step 760. If, however, deviations are significant enough, then appropriate action is taken, via step 762.

Figure 5D:
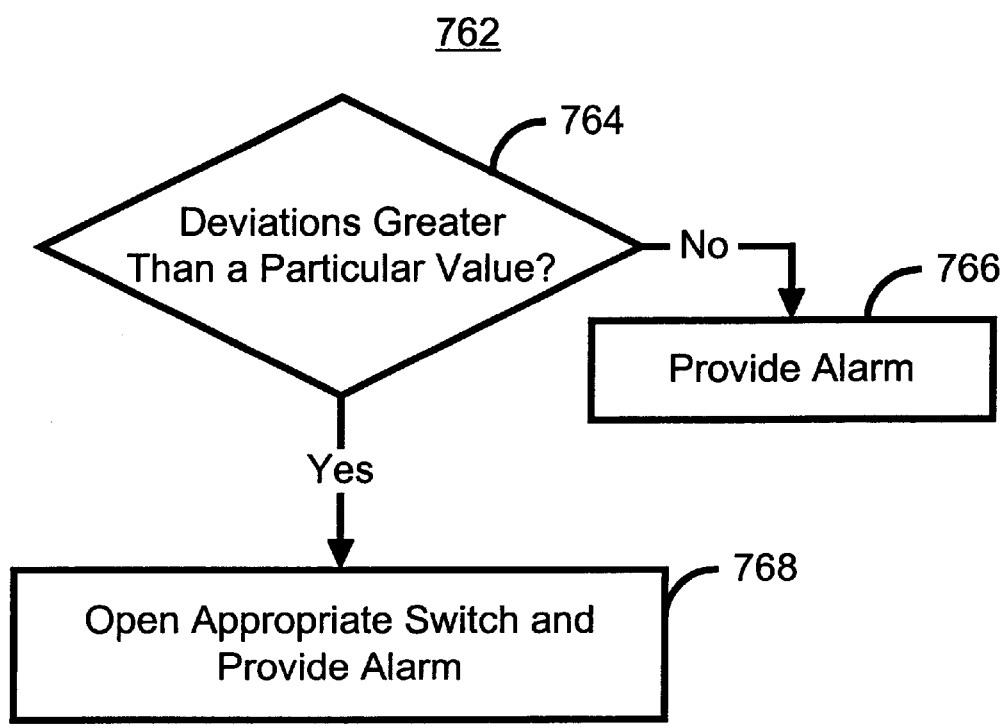
FIG. 5D depicts one embodiment of a method for taking action based on the signatures of a subsystem using the power management module in accordance with the present invention.

FIG. 5D depicts one embodiment of a method for taking action in step 762 based on the signatures of a subsystem using the PMM 100 in accordance with the present invention. It is determined if the deviations are greater than a particular value, via step 764. The value is preferably larger than the size of a deviation, determined in step 758, that is required for any action to be taken. If the deviations are not large enough, then an alarm is provided to the user, via step 766. Thus, a user can look into and correct the deviations at a more convenient time. If the deviations are larger than the particular value, then the switch in the PMM 100 which allows power to flow to the component or subsystem is opened and an alarm is provided, via step 768. For example, suppose the signature indicates that the current through the cranking system should be approximately nine hundred amps. If it is determined that the current through the motor is one thousand five hundred amps (a deviation of six hundred amps) in 764, then an alarm is sounded in step 766. If, however, it is determined that the current through the motor is three thousand amps (a deviation of one thousand one hundred amps) then the switch to the cranking system may be opened in step 768. Thus, damage to the truck tractor or the PMM 100 is prevented and a user is alerted to the problem with the subsystem or component.

For example, the PMM 100 can protect an alternator from a failure of a phase. When one phase of the alternator fails, a three-phase alternator will generate only two-thirds of the power. This will put significant stress on the two working phases of the alternator, which leads to quick and progressive failure of all phases of the alternator. The PMM 100 can detect the loss of a phase through alternator signature recognition using the method 750. In response, the PMM 100 can reduce the demand on the alternator by opening appropriate switch(es) and provide an alarm as discussed in FIG. 5C.

Similarly, the PMM can protect the alternator from failure due to an electrical short or open circuit of its rotor windings using the methods 700, 720, 750 and 762. When shorted or open condition develops, the alternator will generate reduced electrical power. The PMM 100 can detect the short or open by comparing the behavior of the alternator with its signature, as discussed in the method 750. The demand on the alternator can be reduced using the method 762 and an alarm provided. Thus, the alternator can be repaired at the next scheduled maintenance, rather failing unexpectedly.

Furthermore, the signature obtained using the method 700 can be used to detect and account for the failure of the belt and pulley system driving the alternator. Generally, an internal combustion engine drives the alternator using a belt and pulley drive system. One common problem is that the belt and/or pulley slip. When the belt or pulley slips, the alternator cannot generate power that it is designed to generate. The slip condition heats up the belt, pulley, alternator bearings and other portions of the truck tractor. The combination of the lack of power generated and heat built up can disable the vehicle. The PMM 100 can detect these conditions. This is accomplished by knowing the engine speed from communication with an engine control module or other means, and monitoring the alternator signature ripples, using the method 750. Under the normal conditions, the ratio between alternator frequency and engine speed is a fixed ratio. When belt breaks or slips this ratio will change. Thus, a difference in this ratio for the alternator as monitored and the signature as stored can indicate the existence of belt or pulley slippage. The PMM 100 can then take appropriate action, for example using the method 762.

In addition, the PMM 100 can use the methods 700, 750 and 762 to detect and account for freewheeling. Freewheeling occurs when that the starter is turning but the pinion gear is not mechanically engaged with the engine ring gear. The amount of current drawn by starter (cranking subsystem) during freewheeling is lower than normal. By monitoring the level of current drawn by the cranking subsystem and comparing it to the signature for the cranking subsystem, freewheeling can be detected. The PMM 100 can then take appropriate action, for example using the method 762.

Figure 6A:
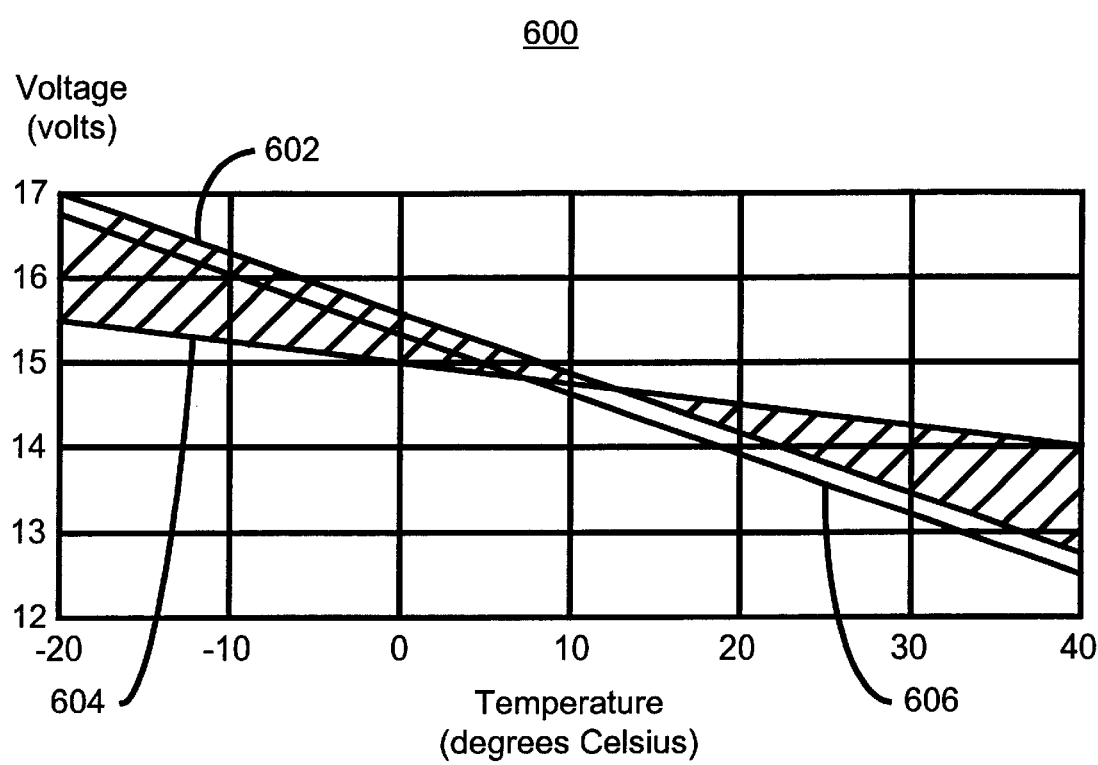
FIG. 6A is a graph depicting how a battery is conventionally charged and how the power management module in accordance with the present invention can charge the battery.

The PMM 10 or 100 can also control the power of the truck tractor so that the condition of the battery is more optimized. In order to do so, the PMM 100 may control charging of the battery, send out alarms or otherwise monitor and control the power supply and subsystems of the truck tractor. Thus, the PMM 10 or 100 controls the storage of power in the power supply. FIG. 6A is a graph 600 depicting how a battery is conventionally charged and how the power management module in accordance with the present invention can charge the battery. Solid lines 602 and 604 depict the range in which conventional systems charge a battery versus temperature. The line 606 depicts the desired, or ideal, charge for a battery versus temperature. Typically, conventional systems charge the battery using any portion of the output of the alternator which is not being consumed by subsystems of the truck tractor. Thus, the outputs of the alternator and power input to the battery are not controlled. As a result, at lower temperatures, most conventional systems undercharge the battery. In addition, most conventional systems overcharge the battery at higher temperatures. However, the PMM 100 in accordance with the present invention can control the truck tractor such that the battery is charged at or near the ideal at a wide range of temperatures. Because the line 606 represents the ideal desired behavior of the battery, the line 606 representing the ideal charge can be considered to the signature of the battery.

Figure 6B:
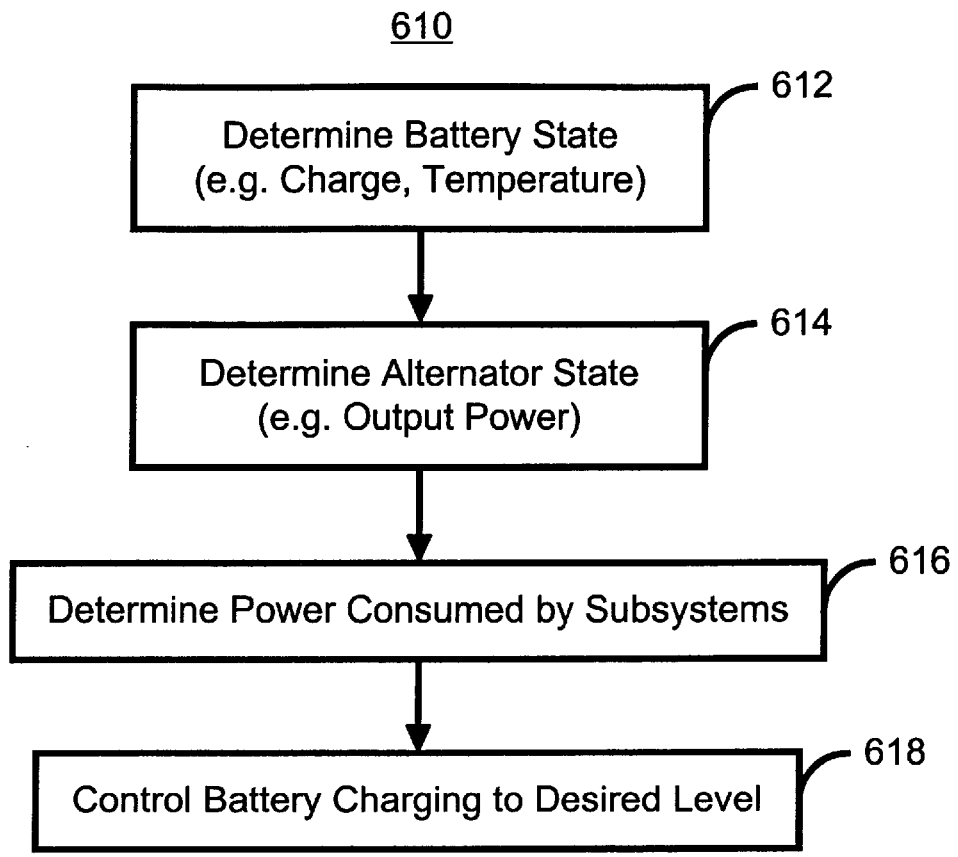
FIG. 6B is a high level flow chart of one embodiment of a method for controlling the charging of the battery using the power management module in accordance with the present invention.

FIG. 6B is a high level flow chart of one embodiment of a method 610 for controlling the charging of the battery using the PMM 10 or 100 in accordance with the present invention. The method 610 can be viewed as performing the step 54 of the method 50 depicted in FIG. 1F. In other words, the method 610 controls the switch of the PMM 100 or 10 based on the program previously entered. The state of the battery is determined by the PMM 100, via step 612. In a preferred embodiment, step 612 includes determining the temperature, the current charge and the desired charge of the battery at the current temperature of the battery. However, step 612 could include determining other factors. Thus, step 612 could be viewed as monitoring the behavior of the battery. The state of the alternator is determined by the PMM 10 or 100, via step 614. Step 614 preferably includes determining the current output of the alternator. The power being consumed, or power available to charge the battery, is then determined, via step 616. The charge of the battery is then controlled, preferably to be close to the ideal charge, via step 618. As discussed above, the ideal charge could be considered to be the signature for the battery. Thus, step 618 can include comparing the current characteristics, or behavior, of the battery to the signature (ideal charge) in order to control the charging of the batter to be close to the ideal. Step 618 may include controlling the output of the alternator, the power consumed by subsystems of the truck tractor or the power input to the battery. For example, the alternator could be controlled to output less power or PWM may be used to reduce the power provided to the battery. In a preferred embodiment, a switch of the PMM 10 or 100 is coupled between the alternator and the battery. The PMM 10 or 100 preferably opens and closes the switch to regulate the power flowing through the battery using PWM. Consequently, the charging of the battery can be controlled. Because the charging of the battery can be controlled to be closer to ideal, the performance and lifetime of the battery may be extended.

Figure 6C:
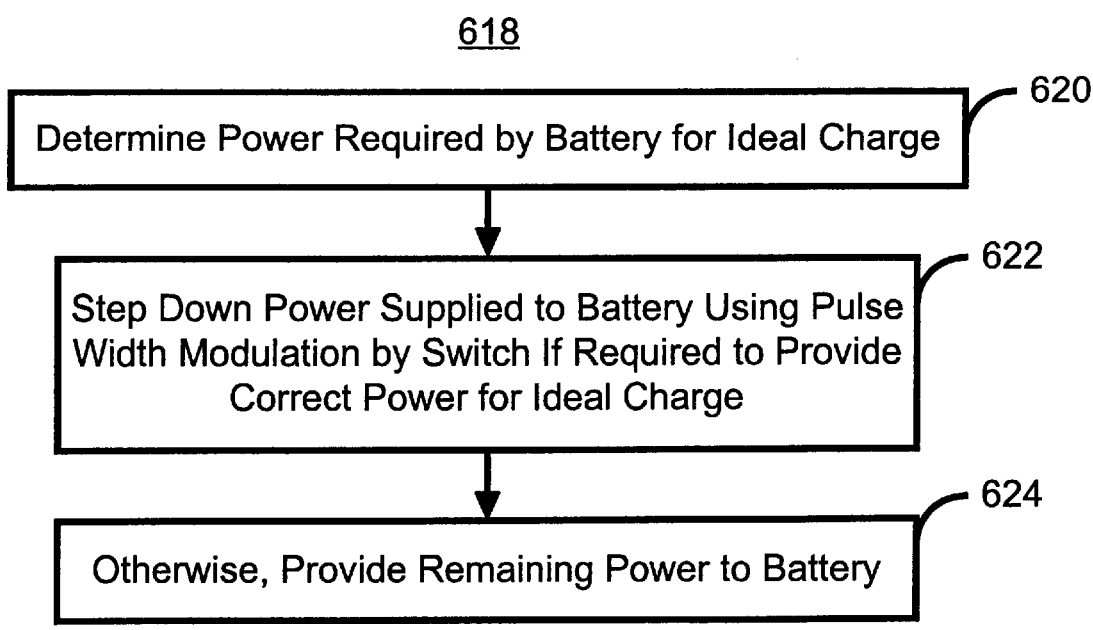
FIG. 6C is a flow chart of one embodiment of a method for controlling the charging of the battery using the power management module in accordance with the present invention.

FIG. 6C is a high level flow chart of one embodiment of a method for performing step 618, controlling the charging of the battery to a desired level. The ideal power to be supplied to the battery for an ideal charge is determined, via step 620. Step 620 is preferably performed using the characteristics of the battery determined in step 612 of the method 610 depicted in FIG. 6B. Referring back to FIG. 6C, the power provided from the alternator to the battery is stepped down using PWM to provide the ideal power to the battery if the ideal power is less than the power that would otherwise be supplied to the battery, via step 622. The power that would otherwise be supplied to the battery is preferably determined using the state of the alternator determined in step 614 and the power being consumed in step 616 of the method 610 depicted in FIG. 6B. Referring back to FIG. 6C, step 622 is performed by toggling one or more switches between the alternator and the battery at a rate sufficient to step down the power provided to the battery to the ideal power. If the ideal power is not less than the power that would otherwise be provided to the battery, then that power is provided to the battery, via step 624. In a preferred embodiment, step 624 provides all remaining available power to the battery after other power consumers are provided with power. Thus, using PWM, the PMM 10 and 100 can charge a battery to at or about the ideal level.

Figure 6D:
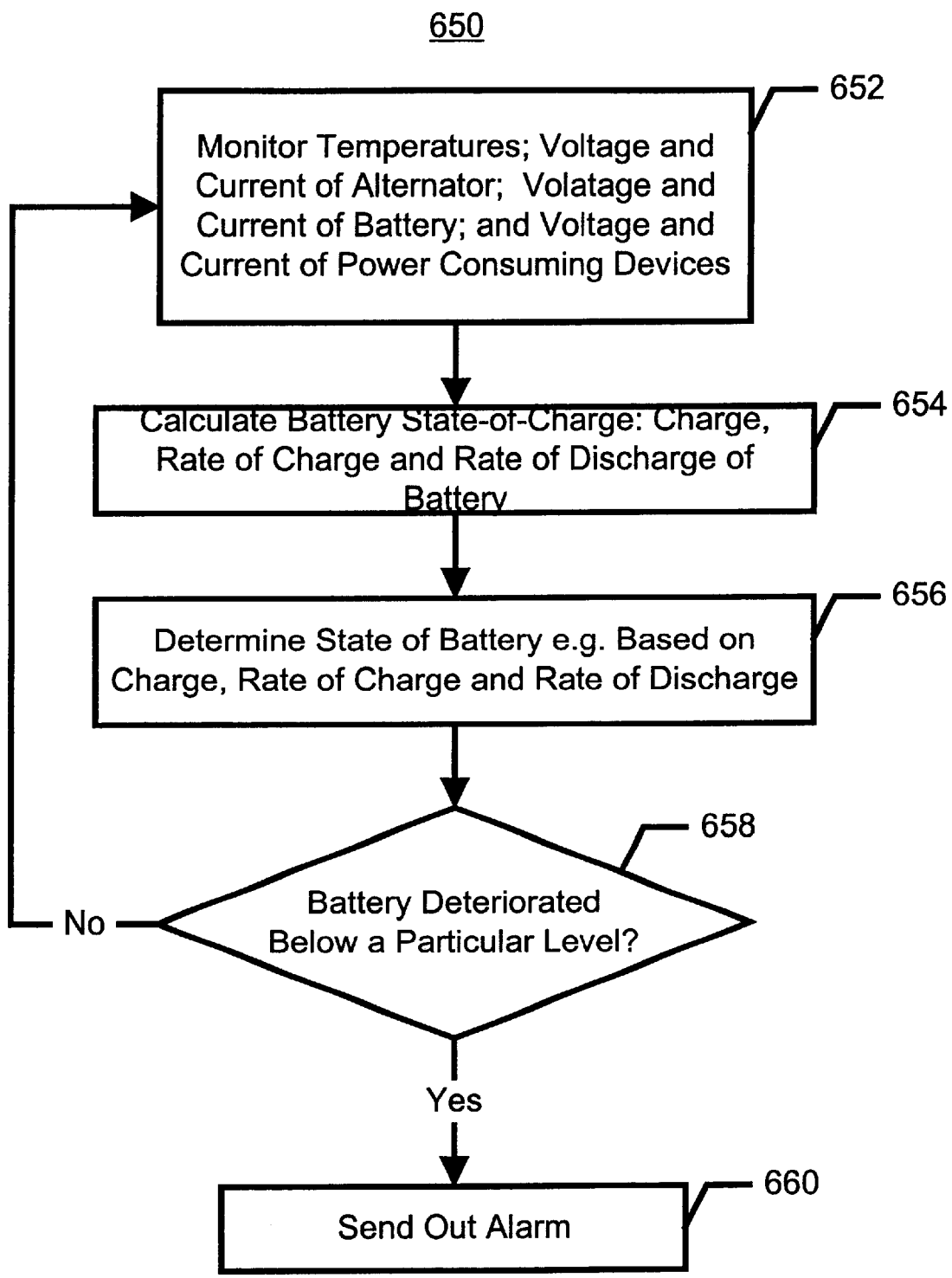
FIG. 6D flow chart of one embodiment of a method for controlling the power using the power management module in accordance with the present invention.

FIG. 6D is a flow chart of one embodiment of a method 650 for controlling the power using the PMM 100 in accordance with the present invention. The temperatures, voltage and current of the alternator; the voltage and current of the battery; and the voltage across and current through the subsystems (power consumers) are monitored by the PMM, via step 652. The state of charge, rate of charge, and rate of discharge of the battery are calculated, via step 654. The condition of the battery is determined, via step 656. It is determined whether the state of the battery has deteriorated below a particular level, via step 658. Thus, step 658 could be considered to compare the monitored behavior of the battery (the state) to the signature (the particular level). If the battery state is not below the particular level, then the method returns to step 652. If so, then an alarm is sent out, via step 660. Thus, the state of the battery can be monitored and kept above a desired level. Preferably the desired level is above a level at which the battery will fail. Because an alarm is provided, the user can change the battery or take other action before the battery fails. Thus, unanticipated failure of the battery may be avoided.

In addition to the above mentioned functions, the PMM 100 in accordance with the present invention may learn the properties of particular subsystems and diagnose potential failures. Subsystems, which can include individual components, typically have individual current and voltage characteristics as a function of time. Based on these characteristics, the PMM 100 can control the power supply to diagnose impending failure and take action against such failure, such as cutting power or providing an alarm to a user. Note that the methods depicted in FIG. 8C can be considered provide such a function for the battery.

Thus, the PMM can utilize its controller, switches, internal sensors or other components to function as an intelligent switch. Thus, the PMM can control power to the various portions of the device in which the PMM is used based on a variety of factors. As a result, performance of the power supply is improved, reliability of the power supply and other portions of the device are improved, and failures are reduced.

A method and system has been disclosed for an intelligent power management system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for managing power in a device having a power source, the system comprising:

at least one switch coupled with the power source; and at least one controller coupled with the switch, the at least one controller for controlling the at least one switch to be open or closed based on a signature of a behavior of a portion of the device, thereby controlling power to the portion of the device based on the signature of the portion of the device;

at least one signal input for receiving data relating to the behavior of the portion of the device, the at least one signal input allowing the at least one controller to monitor the portion of the device and compare the data to the signature for the portion of the device; and wherein the signature of the portion of the device is determined by monitoring the portion of the device remote from the at least one switch while power is provided to the portion of the device, thereby allowing the system to learn the signature of the portion of the device;

wherein the portion of the device includes a battery.

2. The system of claim 1 wherein the signature of the portion of the device is loaded into the at least one controller.

3. The system of claim 1 wherein the portion of the device further includes an alternator and wherein the data includes current through the alternator for particular time.

4. The system of claim 1 wherein the portion of the device further includes an alternator and wherein the data includes voltage output by the alternator for particular time.

5. The system of claim 1 wherein the at least one controller operates the at least one switch based upon the deviation between the data and the signature for the portion of the device.

6. The system of claim 1 wherein the signature further includes an ideal charge for the battery.

7. The system of claim 6 wherein the power supply further includes an alternator, wherein the at least one switch is coupled between the alternator and the battery, and wherein the at least one switch is toggled in order to provide the ideal charge for the battery.

8. The system of claim 1 wherein the device is an automotive system and the power supply includes at least one alternator.

9. The system of claim 1 wherein an alarm can be provided based upon the signature.

10. A method for managing power in a device having a power source, the method comprising the steps of:

(a) providing at least one switch coupled with the power source; and (b) providing at least one controller coupled with the switch, the at least one controller for controlling the at least one switch to be open or closed based on a signature of a behavior of a portion of the device, thereby controlling power to the portion of the device based on the signature of the portion of the device;

(c) monitoring the behavior of the portion of the device remote from the at least one switch while power is provided to the portion of the device to obtain the signature;

(d) providing at least one signal input for receiving data relating to the behavior of the portion of the device, the at least one signal input allowing the at least one controller to monitor the portion of the device and compare the data to the signature for the portion of the device; and (e) wherein the portion of the device further includes a battery.

11. The method of claim 10 wherein the signature of the portion of the device is loaded into the at least one controller.

12. The method of claim 10 wherein the portion of the device further includes an alternator and wherein the data includes current through the alternator for particular time.

13. The method of claim 10 wherein the portion of the device further includes an alternator and wherein the data includes voltage output by the alternator for particular time.

14. The method of claim 10 wherein the at least one controller operates the at least one switch based upon the deviation between the data and the signature for the portion of the device.

15. The method of claim 10 wherein the signature further includes an ideal charge for the battery.

16. The method of claim 15 wherein the power supply further includes an alternator, wherein the at least one switch is coupled between the alternator and the battery, and wherein the at least one switch is toggled in order to provide the ideal charge for the battery.

17. The method of claim 10 wherein an alarm can be provided based upon the signature.

18. The method of claim 10 wherein the device is an automotive system and the power supply includes at least one alternator and at least one battery.

19. A system for managing power in a device having a power source, the system comprising:

at least one switch coupled with the power source;

at least one controller coupled with the switch, the at least one controller for controlling the at least one switch to be open or closed based on a signature of a behavior of a portion of the device, thereby controlling power to the portion of the device based on the signature of the portion of the device;

wherein the signature of the portion of the device is determined by monitoring the portion of the device remote from the at least one switch while power is provided to the portion of the device, thereby allowing the system to learn the signature of the portion of the device; and wherein an alarm can be provided based upon the signature.

20. A method for managing power in a device having a power source, the method comprising the steps of:

(a) monitoring a portion of the device to determine a behavior of the portion of the device;

(b) comparing the behavior of the portion of the device to a signature for the portion of the device; and (c) utilizing at least one controller to operate at least one switch based on the behavior of the portion of the device and the signature of the portion of the device, the at least one switch being coupled with the power source, the at least one controller and the portion of the device;

(d) determining the signature of the portion of the device, the signature being obtained by monitoring the behavior of the portion of the device remote from the at least one switch while power is supplied to the portion of the device; and (e) wherein the portion of the device further includes a battery.

21. The method of claim 20 wherein the signature of the portion of the device is loaded into the at least one controller.

22. The method of claim 20 wherein the signature determining step (d) further includes the steps of:

(d1) obtaining a sample of the behavior of the portion of the device;

(d2) determining whether a sufficient number of samples have been obtained;

(d3) providing the signature of for the portion of the device using the sample if the sufficient number of samples have been obtained; and (d4) repeating steps (d1) and (d2) if the sufficient number samples have not been obtained.

23. The method of claim 20 wherein the comparing step (c) further includes the steps of:

(c1) determining whether a particular deviation exists between the behavior of the portion of the device and the signature of the portion of the device.

24. The method of claim 23 further comprising the step of:
(e) providing an alarm if the particular deviation exists.

25. The method of claim 23 wherein the utilizing step (c) further includes the step of,
(c1) utilizing the at least one controller to open or close the at least one switch based upon the deviation between the data and the signature for the portion of the device.

26. The method of claim 20 wherein the portion of the device further includes an alternator and wherein the monitoring step (a) monitors a current through the alternator for particular time.

27. The method of claim 20 wherein the portion of t he device further includes an alternator and wherein the monitoring step (a) monitors voltage output by the alternator for particular time.

28. The method of claim 20 further comprising the step of:
(e) using the controller to provide an alarm can be provided based upon the signature and the behavior.

29. The method of claim 20 wherein the signature further includes an ideal charge for the battery.

30. The method of claim 29 wherein the power supply further includes an alternator, wherein the at least one switch is coupled between the alternator and the battery, and wherein the at least one switch is toggled in order to provide the ideal charge for the battery.

31. The method of claim 20 wherein the device is an automotive system and the power supply includes at least one alternator and at least one battery.

32. The method of claim 31 wherein the comparing step (c) can detect a loss of phase of the at least one alternator.

33. The method of claim 31 wherein the comparing step (c) can detect an electrical short or open circuit of the at least one alternator.

34. The method of claim 31 wherein the at least one alternator includes at least one belt and pulley system and wherein the comparing step (c) can detect a failure of the belt and pulley system.

35. The method of claim 20 wherein the portion of the device includes a cranking subsystem and wherein the comparing step (c) can detect a failure of the cranking subsystem.

36. The method of claim 35 wherein the comparing step (c) can detect freewheeling of the cranking subsystem.

37. A method for managing power in a device having a power source, the method comprising the steps of:
(a) monitoring a portion of the device to determine a behavior of the portion of the device;
(b) comparing the behavior of the portion of the device to a signature for the portion of the device; and
(c) utilizing at least one controller to operate at least one switch based on the behavior of the portion of the device and the signature of the portion of the device, the at least one switch being coupled with the power source, the at least one controller and the portion of the device;
(d) determining the signature of the portion of the device, the signature being obtained by monitoring the behavior of the portion of the device remote from the at least one switch while power is supplied to the portion of the device; and
(e) using the controller to provide an alarm can be provided based upon the signature and the behavior.

38. A method for managing power in a device having a power source, the method comprising the steps of:
(a) monitoring a portion of the device to determine a behavior of the portion of the device;
(b) comparing the behavior of the portion of the device to a signature for the portion of the device; and
(c) utilizing at least one controller to operate at least one switch based on the behavior of the portion of the device and the signature of the portion of the device, the at least one switch being coupled with the power source, the at least one controller and the portion of the device;
(d) determining the signature of the portion of the device, the signature being obtained by monitoring the behavior of the portion of the device remote from the at least one switch while power is supplied to the portion of the device; and
wherein the portion of the device includes a cranking subsystem and wherein the comparing step (c) can detect a failure of the cranking subsystem.

* * * * *